AUTOMATIC UNIVERSAL DRAFTING AND LAYOUT TABLE

Filed Jan. 17, 1961 5 Sheets-Sheet 1

Laurence F. Moore Sr.
INVENTOR.

BY Nilsson & Robbins

ATTORNEY

Laurence F. Moore Sr.
INVENTOR.

BY Nilsson & Robbins

ATTORNEY

AUTOMATIC UNIVERSAL DRAFTING AND LAYOUT TABLE

Filed Jan. 17, 1961 5 Sheets-Sheet 3

Laurence F. Moore Sr.
INVENTOR.

BY Nilsson & Robbins

ATTORNEY

Laurence F. Moore Sr.
INVENTOR.

BY Nilsson & Robbins

ATTORNEY

AUTOMATIC UNIVERSAL DRAFTING AND LAYOUT TABLE

Filed Jan. 17, 1961 5 Sheets-Sheet 5

Laurence F. Moore Sr.
INVENTOR.

BY Nilsson & Robbins

ATTORNEY

United States Patent Office 3,193,943

Patented July 13, 1965

3,193,943

AUTOMATIC UNIVERSAL DRAFTING AND LAYOUT TABLE

Lawrence F. Moore, Sr., 8372 Stansbury Ave., Panorama City, Calif.

Filed Jan. 17, 1961, Ser. No. 83,347
11 Claims. (Cl. 33—184.5)

The present invention relates to a graphic arts table, and more particularly to a table which is useful for precision drawing, layout work, plate registering and other graphic-arts operations requiring a high degree of accuracy.

In the field of graphic arts, a vast amount of composition work is performed, manually, much of which must be done with a high degree of accuracy. For example, considerable accuracy is required in the graphic-arts operations of registrating plates for multi-color printing, precision drafting, and typographical layout work. In the past, this work has normally been performed on composition tables providing only limited layout aids and therefore the work has required a high degree of skill. Furthermore, because of the care required, composition work on prior tables has been extremely time-consuming. As a result, a need exists for a graphic arts table which may be used with speed by semi-skilled persons to perform highly accurate composition work.

In the performance of various composition projects, the need often arises to provide a precise space relationship, as between a pair of lines. Of course, various measuring devices can be employed to gauge the space; however, unless the device is cooperatively integrated with the structure of the graphic arts table, a high degree of skill is required to obtain fine accuracy. It has previously been proposed to attach various measuring devices to graphic-arts tables; however, in general, these prior arrangements have either employed flexible structures which lacked accuracy, or their mounting arrangement has permitted only limited use of the table.

In addition the problem of accurately positioning lines during a composition, the operation of actually scribing the lines requires considerable care and skill to obtain uniformity. Previous composition tables have provided various straight-edge devices to be used as guides in scribing lines; however, in using a straight-edge, considerable care and skill are required to maintain a consistent pressure upon the scribing tool and uniform spacing between the tool and the straight edge. Of course, these operations must be performed to produce a uniform line.

In addition to the above difficulties, the performance of precision measurements and the execution of uniform markings on prior graphic-arts tables have been somewhat accentuated by the working surface of the table being inaccessible to the operator. That is, various metering devices and straight-edge devices incorporated into prior graphic-arts tables often necessitated that the table remain in a horizontal position. Therefore, the table top could not be variously tilted from a horizontal position to provide the surface more accessible to the user.

In general, the present invention comprises a graphic-arts table having a table top which provides a working surface. Gear racks are positioned at the sides of the working surface of the table in opposing parallel pairs and carriages are mounted between the opposing racks. The carriages include gear wheels, the teeth of which mesh with the teeth of gear racks to enable precise movement of the carriage relative to the table surface. Straight-edge devices and working tools are then affixed to the carriages so as to be variously positioned relative to the table surface by the cooperative manipulation of the carriages. The gear arrangements in the carriages include indicators for manifesting distance, and a clutch mechanism for disengaging the gears from the indicator devices to permit adjustment. The table top with the associated carriages is adjustably-mounted upon a frame so that the working surface may be variously tilted from the horizontal to provide better access to the work.

An object of the present invention is to provide an improved graphic-arts composition table.

Another object of the present invention is to provide a graphic-arts table which may be economically constructed and which may be manipulated by a semi-skilled operator to perform accurate composition.

Still another object of the present invention is to provide a graphic-arts table employing inelastic means to accurately indicate various locations upon the surface of the table and perform various composing operations.

A further object of the present invention is to provide a graphic-arts composition table employing rigid gears to indicate locations and operate in two planes, which gears may be operated in combination to variously position and move a working tool over the table top.

Still a further object of the present invention is to provide an adjustable graphic-arts table which includes a pair of perpendicular carriage units including indicators to accurately locate various relative distances on the working surface of the table, and which table may be adjusted to tilt the working surface for convenient access.

These and other objects of the present invention will become apparent from a consideration of the following description, taken in conjunction with the drawings, wherein.

Figure 1:
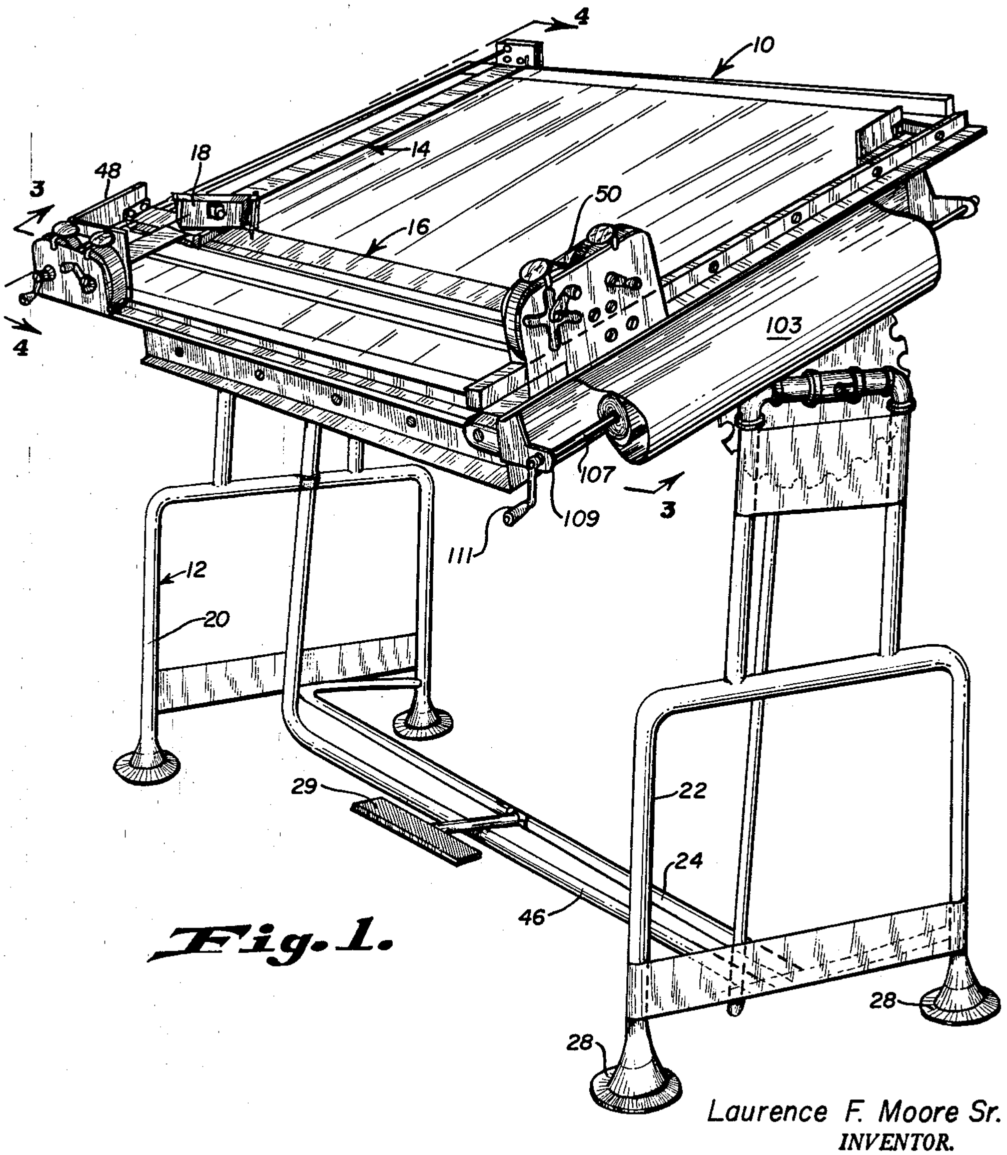
FIG. 1 is a perspective view of a graphic-arts table constructed in accordance with the present invention.

Referring initially to FIG. 1, there is shown a table top 10, pivotally mounted upon a support frame 12. A pair of carriages 14 and 16 extend transversely across the table top 10 at right angles to each other. The carriages may be variously positioned upon the table top 10 by a rigid system of gears (described hereinafter) which includes indicators to facilitate precise positioning of the carriages.

A tool holder 18 is slidably mounted upon the carriages 14 and 16 so as to be positioned at the juncture of the carriages. By variously manipulating the carriages, the tool holder may be moved with precision over the surface of the table top to perform various graphic-arts operations, as the execution of extremely-uniform lines as well as certain cutting operations. The manner in which the carriages 14 and 16 are mounted upon the table top 10 permits the table top to be variously tilted without displacing the carriages from a set position. As a result, the working surface of the table is generally accessible and enables greater accuracy in executing composing operations.

Figure 2:
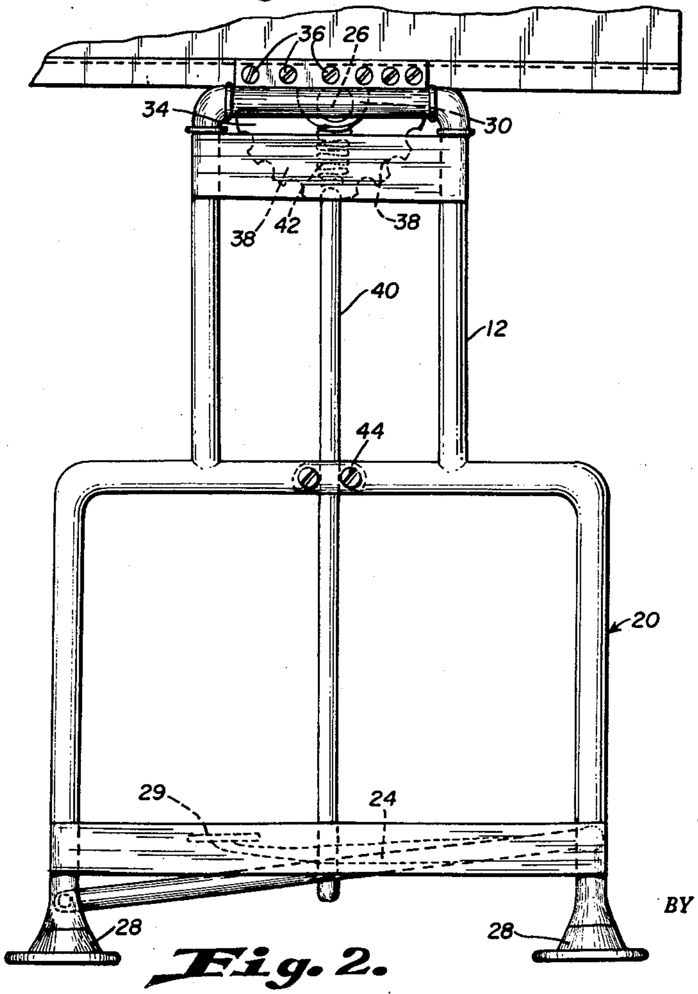
FIG. 2 is a side plan view of a portion of the apparatus of FIG. 1.

The pivotal arrangement of the table top 10 upon the support frame 12, which permits the top to be tilted may be best considered by simultaneous reference to FIGS. 1 and 2. The support frame 12 comprises a pair of spaced-apart reinforced "A" frames 20 and 22. These frames are located below the sides of the table top 10 and are interconnected by a bottom brace 24 and a top pivot bar 26 (FIG. 2) to form a rigid support structure. The lower ends of the "A" frames 20 and 22 are mounted upon casters 28 and a foot rest 29 extends transversely from the bottom brace 24.

A pair of yokes 30 (FIG. 2) slidably receive the pivot bar 26 and are mounted in central alignment on the bottom rails of the table top 10. The pivot bar 26 also extends through semicircular lock plates 34 which are affixed to the ends of the table top 10 by bolts 36. The lock plates 34 have slots 38 spaced about their arcuate edges, which receive the ends (only one shown in FIG. 2) of vertically-mounted lock bars 40 to hold the table top 10 in any of a variety of positions relative to the horizontal. The lock bars 40 are urged upwardly into the slots 38 by a pair of coil springs 42 (FIG. 2) affixed between the lock bars and the pivot bar 26. The lock bars 40 extend from the lock plate 34 downwardly through a pair of yokes 44 (affixed to the A frames 20 and 22) and are joined by a horizontal foot bar 46 which is employed to displace the lock bars from the slots 38 and position the table top 10 as desired. Thus, the position of the table top may be simply and easily changed by using a foot to depress the foot bar 46, and withdrawing the lock bars 40 from slots 38, then repositioning the table and releasing the foot bar to permit the springs 42 to return the lock bars 40 into engagement with the lock plates 34.

As the table top 10 is variously tilted the carriages 14 and 16 remain fixed in the positions in which they have been set. The structures of the carriages 14 and 16, operating in this manner are generally similar; therefore, only the carriage 16 is considered in full detail.

Figure 3:
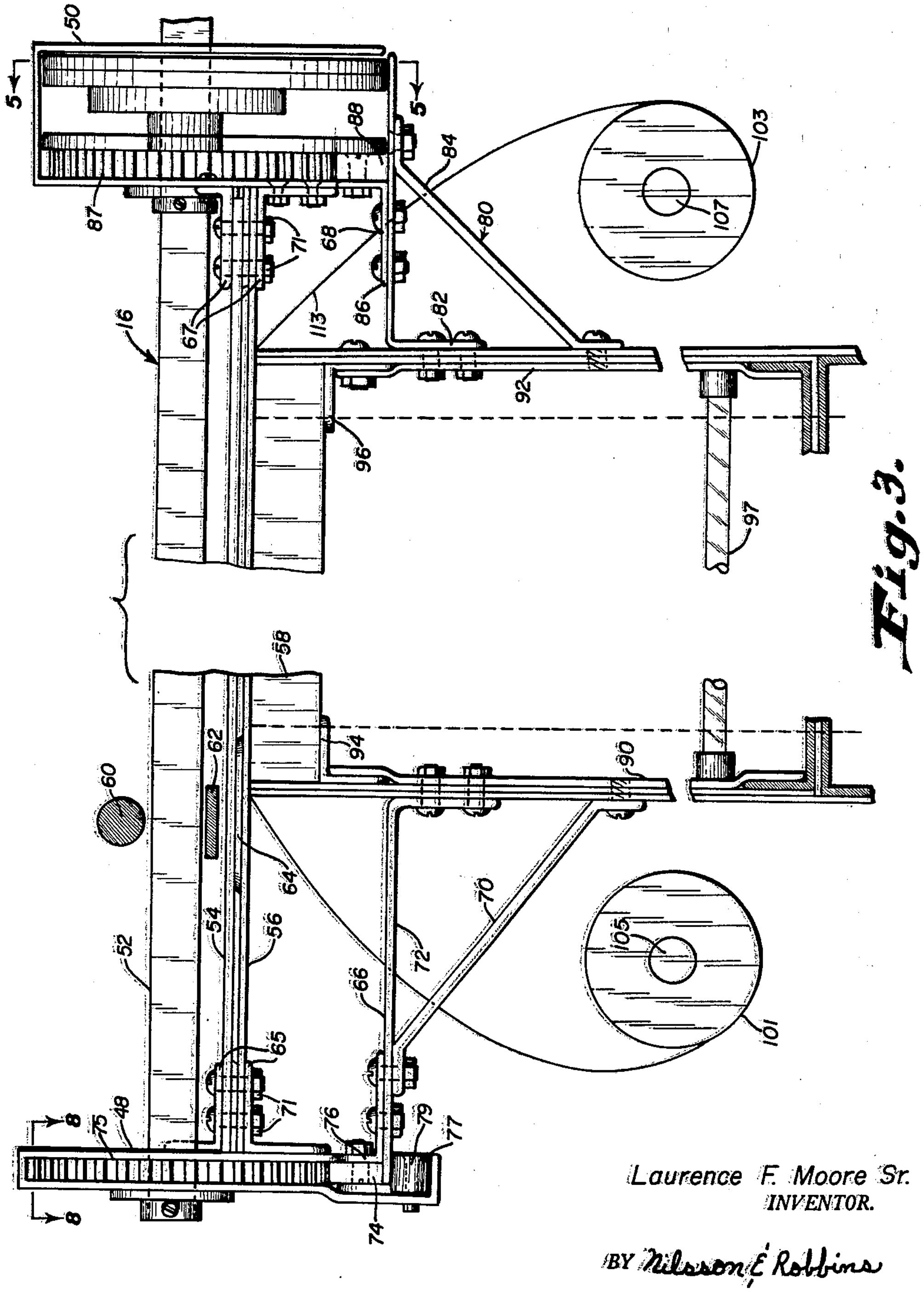
FIG. 3 is a vertical sectional view taken along line 3—3 of FIG. 1.

The carriage 16 terminates in a pair of gear boxes 48 and 50 (FIG. 3) which lie adjacent the side edges of the table top 10 and are interconnected by a rotative shaft 52, a guide bar 54 and a straight-edge 56. Similar interconnecting elements of the carriage 14 cross these members of the carriage 16, that is, the rotative shaft 60, guide bar 62 and straight-edge 64 of the carriage 14 lie respectively above similar elements of the carriage 16. The straight edge 56 and the guide bar 54 are affixed between the gear boxes 48 and 50 by corner brackets 65 and 67 which are unitary with the gear boxes and which receive bolts 71 that also pass through the straight edge and the guide bar. The straight edges 56 and 64 of the carriages are contiguous to the panel 58 which provides the working surface of the table.

The ends of the carriage 16 are supported below the gear boxes 48 and 50 by side brackets 66 and 68 (FIG. 3) which extend outward from the sides of the table top 10. The bracket 66 includes a gusset 70 which supports an elongate plate 72 along the edge of the table top, both the gusset and the plate are bolted to the side of the table top. The external edge of the plate 72 supports a gear rack 74, which is held in place by an angular bracket 76 that is bolted to the rack and the plate 72. The teeth of the rack 74 mesh with the teeth of a gear wheel 75 in the gear box 48, which gear is affixed to the rotative shaft 52. Therefore, rotation of the shaft 52 moves the carriage as a result of the meshed teeth of the gear wheel 75 and the rack 74.

The other end of the carriage 16 is supported beneath the gear box 50 by an arrangement similar to that described above including a bracket 80 formed by an elongate plate 82 which is supported at the table edge by a gusset 84. Both the gusset 84 and the plate 82 are bolted to the table top. A corner bracket 86 is bolted to the edge of the plate 82 and a gear rack 88 is in turn held to the bracket 86 by bolts. The gear rack 88 engages a gear wheel 87 which is also affixed to the rotative shaft 52. Thus the gears at the ends of the carriage engage the racks which are carried by the brackets 66 and 80.

As indicated above, the brackets 66 and 80 which support the carriage 16 are affixed to the sides 90 and 92 of the table top 10 (FIG. 3) which also supports elongate angular members 94 and 96 inside the frame of the table top, to hold the panel 58 in position. The panel 58 may comprise an opaque sheet of material, or alternatively, various forms of translucent or transparent material, as glass, which facilitates various tracing operations upon illumination of the chamber defined by the sides 90 and 92 and the panel 58 by fluorescent tubes 97.

The sides 90 and 92 of the table top 10 also support rolls 101 and 103 of paper which are held on spindles 105 and 107 respectively. The spindles are affixed to the table top 10 by brackets 109 (FIG. 1) which include a crank 111 to facilitate revolving the spindles and positioning paper sections 113 upon the working surface of the table top 10.

Figure 5:
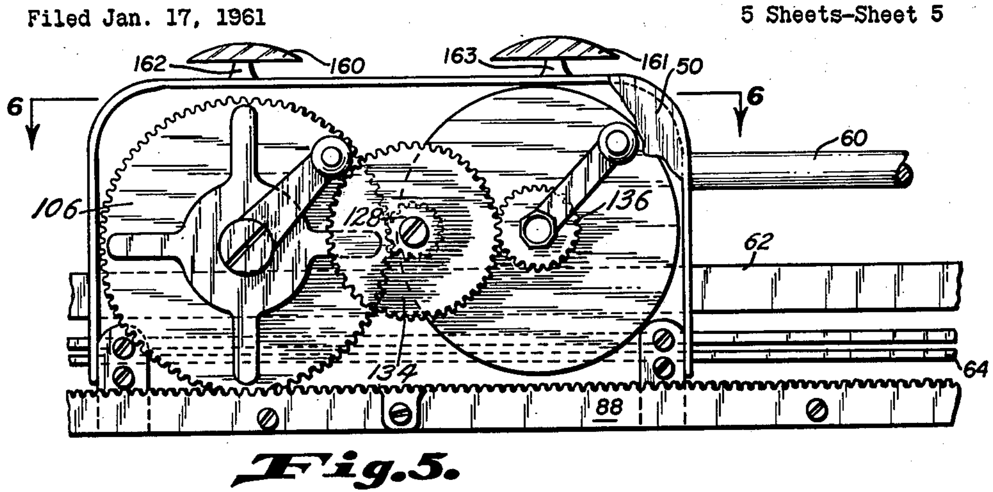
FIG. 5 is an enlarged vertical sectional view taken along line 5—5 of FIG. 3.
Figure 6:
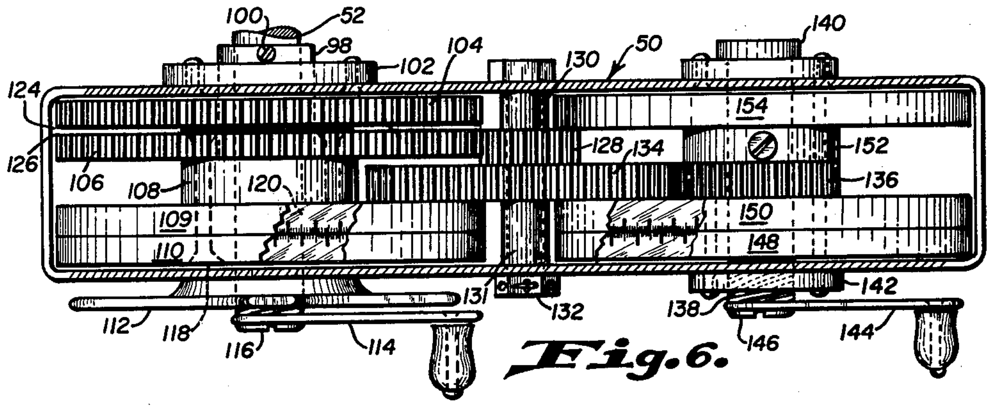
FIG. 6 is a horizontal sectional view taken along line 6—6 of FIG. 5.

Returning to consider the carriage 16, reference will now be made to FIGS. 5 and 6 showing the contents of the gear box 50.

The rotative shaft 52 (FIG. 6) carries a collar 98 adjacent the gear box 50, affixed thereto by a set screw 100. The collar 98 is journalled in a collar bearing 102 which is rigidly attached to the side of gear box 50. Inside the gear box 50, the rotative shaft 52 passes through gear wheel 104 (similar to wheel 87) and gear wheel 106, spacer 108, indicator wheels 109 and 110, and a clutch 112. The end portion of the shaft 52 carries threads that engage mating internal threads in the clutch 112 which is only partially inside the gear box 50.

A crank 114 is affixed to the end of the shaft 52 by a stud 116 positioned in an internally-threaded bore in the end of the shaft 52. The shaft 52 is affixed to the gear wheel 104, however, it is not attached to the gear wheel 106, the spacer 108, or the indicator dials 109 and 110 which elements are bolted together as an integral unit by bolts 118 and 120 (shown in phantom).

A pair of clutch plates 124 and 126 are affixed in facing relationship upon the gear wheels 104 and 106 respectively so as to be forced into engagement when the clutch 112 is turned down on the threaded section of the shaft 52. Of course, when the clutch 112 is backed off the shaft 52, the gear wheel 104 is effectively disengaged from the gear wheel 106 so that the dial wheels 109 and 110 may be freely adjusted without moving the gear wheel 104 or the carriage 16.

The teeth of the gear wheel 106 mesh with a pinion 128 which is affixed upon a horizontal shaft 130 comprising a bearing sleeve 131 mounted on a bolt 132. A gear wheel 134, which engages a gear wheel 136, is also carried on the shaft 130, and is affixed to the pinion 128. The gear wheel 136 is mounted upon a horizontal shaft 138, supported in the gear box 50 by bearings 140 and 142 and having a crank 144 attached thereto by a stud 146 mounted in a threaded end bore in the shaft.

Inside the gear box 50, the shaft 138 carries a pair of indicator wheels 148 and 150 adjacent the gear wheel 136 and another indicator wheel 154, separated from the gear 136 by a spacer 152, also mounted on the shaft 138 and affixed thereto.

In the operation of the gears in the gear box 50, the teeth of the gear wheel 104 (FIG. 5) mesh with the rack 88 so that by revolving either of the cranks 114 or 144 (when the clutch plates 124 and 126 are engaged), the gear wheels are turned driving the gear wheel 104 to move the carriage 16 across the table top 10. Of course, the fineness of the desired movement determines which of the cranks 114 or 144 is employed. That is, the crank 144 is essentially a micrometer control geared to facilitate very fine movement of the carriage, while the crank 114 provides direct drive to the gear wheel 104 and each rotation of the crank 114 displaces the carriage by an amount coinciding to the periphery of the gear wheel 104.

Figure 7:
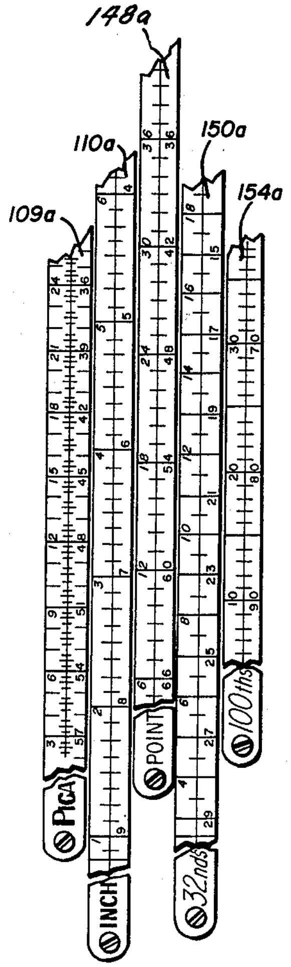
FIG. 7 is a plan view of the measuring indicators shown in FIG. 6.

Movement of the cranks 114 and 144 to displace the carriage is indicated in different units of measure by the indicator wheels 109, 110, 148, 150 and 154. These wheels carry indicating strips 109*a*, 110*a*, 148*a*, 150*a*, and 154*a* as shown in FIG. 7. The strip 109*a* is in the pica scale, strip 110*a* is in inches, strip 148*a* is in points, strip 150*a* is in 32nds of inches and strip 154*a* is in 100ths of inches. The indicator strips 109*a* and 110*a* substantially coincide to the actual scale indicated because these strips are placed on indicator wheels which are of the same diameter as the gear wheel 104. However, the scales of the indicator strips 154*a*, 150*a*, and 148*a* are enlarged from the actual measurement indicated by reason of the gearing arrangement in the gear box 50 and therefore facilitate greater precision. Of course, this arrangement also results in greater ease in positioning the carriage in accordance with a precise measurement. Further ease in precisely positioning the carriage is obtained by magnifying lenses 160 and 161 (FIG. 5) which are supported above the gear box 50 on lens mounts 162 and 163 respectively so as to present enlarged scales to the viewer observing the gear box 50.

Figure 8:
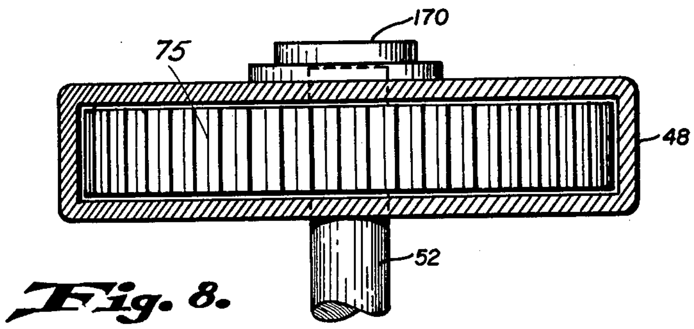
FIG. 8 is an enlarged horizontal sectional view taken along the line 8—8 of FIG. 3.

The end of the carriage 16 remote from the gear box 50 is supported by the gear wheel 75 housed in the gear box 48 (FIG. 8). The shaft 52 of the carriage is affixed through the gear wheel 75 and journaled into a bearing cap 170, which is unitary with the gear box 48. The teeth of the gear wheel 75 are held in meshed relationship with the teeth of the rack 74 (FIG. 3) by a roller 77 affixed to the gear box 48 by a stud 79. The roller 77 engages the bracket 70 below the rack 74 to hold the carriage 16 down on the table top 10.

Thus, the carriage 16 is supported upon the gear wheels 75 and 104, and revolution of the shaft 52 (carrying these wheels) moves the carriage 16 evenly and uniformly across the table top 10 by the engagement of gear wheels with the gear racks 74 and 88.

Figure 4:
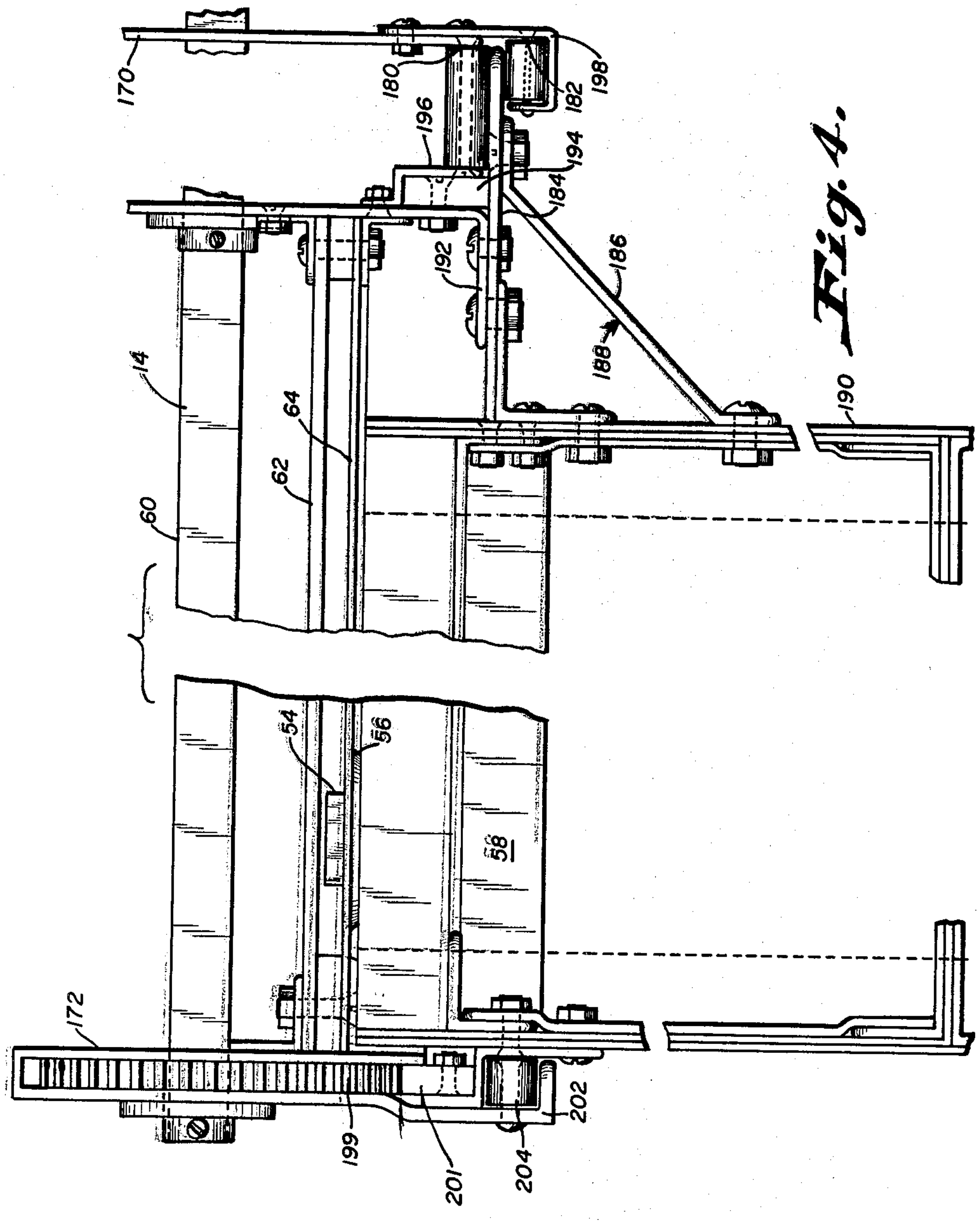
FIG. 4 is a vertical sectional view taken along line 4—4 of FIG. 1.

The structure and mode of operation of the carriage 14 is generally similar to that of carriage 16, as described above. However, the support arrangement differs to some extent. The details of the carriage structure 14 will now be considered with reference to FIG. 4. The gear box 170 contains gear wheels similar to those in the gear box 50, however, a pair of rollers 180 and 182 are mounted at the lower end of the gear box 170 which are axially parallel to the gears in the box. The roller 180 rides above a plate 184 which is supported by a gusset 186 to form a bracket 188 which is bolted to the end section 190 and carries a bracket 192 which supports the gear rack 194. The roller 180 is held within the gear box 170 by an arm 196 which carries a bolt that passes through the roller and the end wall of the gear box 170.

The roller 182 rides beneath the plate 184 on an arm 198 which is affixed to the gear box 170. Thus, the rollers 180 and 182 engage both sides of the plate 184 to support the carriage 14. This additional support is provided for the carriage 14 to better accommodate tilting of the table top 10, which offsets the carriage 14 from a horizontal position.

The carriage 14 is guided at its other end by the gear wheel 199 contained in the gear box 172 which engages the rack 201. The gear box 172 has a bracket 202 affixed thereto which carries a roller 204 serving to further guide the carriage.

In view of the above description it may be seen that the carriages 14 and 16 may be easily and conveniently located at various positions on the table top 10. The location of these positions may serve to provide a guide line along one of the straight-edges, or the carriages may be manipulated to move the tool holder 18 to perform various composing operations.

Figure 9:
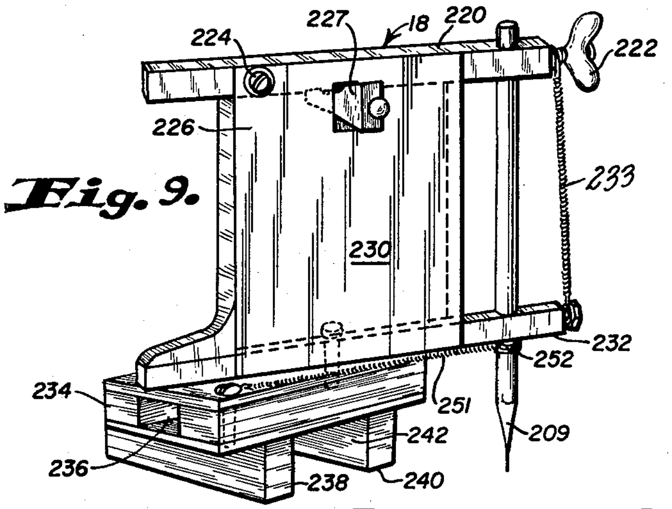
FIG. 9 is an enlarged perspective view of the tool holder as shown in FIG. 1.

The tool holder 18 may be employed to support a variety of different tools as pencils, pens, drafting instruments, matt knives and other devices employed in the composition of graphic work. In FIG. 9, the tool holder 18 is shown supporting a pencil 209 as an exemplary tool. The pencil 209 is affixed in a support arm 220 by a set screw or a wing nut 222. The support arm 220 is pivotally mounted as a result of a bolt 224 extending through a frame 226 and the support arm. The frame 226 consists of side plates as the plate 230, affixed to a support rail 232 which is pivotally mounted upon a base block 234. A flat cam 227 passes through the frame 226 under the arm 220, thus the pencil may be held in a raised position by urging the cam into the frame. The base block 234 includes an upper section having a passage 236 to receive the guide rail 62 and a pair of extensions 238 and 240 defining a passage 242 to receive the guide rail 54.

The pencil 209, or other tool extends from the support arm 220 through the base arm 232 to the working surface. A spring 233 is affixed between the two arms 220 and 232, serving to urge the pencil downward to contact the working surface of the table top 10. A spring 251 is also affixed to a ring 252 which encircles the pencil. The spring 251 is attached to the base block 234 so as to hold the pencil in position. Thus, the pencil is urged downwardly against the surface of the table top with a uniform pressure and may be simply and easily lifted from a working position by pivotally raising the arm 220.

The manner in which the base block 234 engages the perpendicular guide bars 54 and 62 holds the carriages against gravitational movement when the table top 10 is tilted. Of course, the carriage 16 is also held by the gearing arrangement in the gear box 50, thus this aspect of the apparatus provides considerable advantage and flexibility of use for the table.

The graphic-arts table of the present invention may be used in a variety of ways and a few exemplary operations will be considered with reference to FIG. 1. Paper to be employed upon the table may be provided from the roll 103 carried upon the spindle 107. In such event, the crank 111 is used to position a fresh section 113 of paper over the table surface. Next, the table top is placed in a position most convenient for the type of work to be performed, i.e. either horizontal or variously tilted from the horizontal. This operation is performed simply by depressing the bar 46, pivotally swinging the table top 10 to the desired position, then releasing the bar.

The actual composition work may now proceed by manipulation of the carriages 14 and 16 to perform the desired operations. For example, it may be desired to scribe a pair of parallel lines which are accurately spaced apart, which, may be performed either manually or by the tool holder 18. To manually scribe a pair of lines the carriage 16 is placed to provide the straight-edge 56 at the desired location, to scribe one line. Of course, if an extremely uniform line is to be scribed, it may be desirable to employ the tool holder 18 for this purpose, in which event the straight edge may be removed if desired by removing the bolts 71. To scribe the line with a tool in the tool holder 18, the carriage 14 is manipulated to cross the table thereby driving the tool holder 18 along the guide rail 54. As this movement occurs, the pencil or other composing tool carried by the tool holder 18 performs the desired operation upon the working medium.

The repositioning of the carriage 16 to indicate the location of the second line may be performed with the assistance of the indicators carried in the gear box 50. This operation may be performed by releasing the clutch 112 (FIG. 6), so that the indicator wheels 109, 110, 154, 150 and 148 may be revolved freely to indicate a reference setting, as zero. After the reference setting is established, the clutch 112 is turned down upon the shaft 52 engaging the indicator wheels to the gear 104. Next, one of the cranks 144 or 114 is turned to drive the carriage to the desired position. It is to be noted, that as the carriage approaches the desired position it may be advisable to use the crank 144 to obtain micrometer precision in positioning the carriage according to the indications on one of the dial wheels in the gear box. Upon accurate positioning of that carriage, the second line may be scribed either manually or by the tool holder 18 as described above.

By employing an apparatus incorporating the principles of the present invention as described above, very high precision may be obtained in the execution of graphic-arts composition. This accuracy results from the structure of the present invention which permits micrometer adjustment of the carriages to any desired location.

Another important feature of the present invention resides in the arrangement wherein the two carriages may both be simultaneously positioned at various locations on the table and which arrangement facilitates the movement of the tool holder 18 to perform various operations under uniform pressure.

Still another important feature of the present invention resides in the fact that the table can be variously tilted without displacing the carriages from the positions in which they are set.

Although various features and concepts of the present invention have been set forth in the foregoing illustrative embodiments, the present invention is not to be limited in accordance therewith but is to be constructed in accordance with the claims set forth below:

What is claimed is:

1. A graphic arts table comprising: a table top to provide a working surface; at least two pairs of parallel gear racks, the racks in each pair being positioned at opposing sides of said table top adjacent said working surface; at least two pairs of gear means, the gear means in each pair being associated in pairs with a pair of said racks; at least two rotative shafts, each interconnecting a pair of gear means; at least two guide bars each extending parallel to one of said shafts and mounted relative to said gear means whereby to simultaneously pass transversely across said table top and a tool holder means supported on said guide bars at the juncture thereof to be variously moved over said working surface.

2. Apparatus according to claim 1 wherein said gear means comprises a first gear wheel to mesh with one of said gear racks; clutch means for engaging and disengaging said first gear wheel from an associated rotative shaft; and indicator means connected to said first gear wheel for indicating the position of said gear means relative to said working surface.

3. Apparatus according to claim 1 wherein said gear means comprises: a first gear wheel connectable to one of said gear racks; clutch means for engaging and disengaging said first gear wheel from said one of said gear racks; at least one second gear wheel meshed with said first gear wheel and having a rotational rate different from said first gear wheel; and means for manually exerting a force upon each of said first and said second gear wheels.

4. A graphic arts table comprising: a table top for providing a working surface; two pairs of parallel gear racks, the racks in each pair being positioned at opposing sides of said table top; two pairs of gear means, the gear means in each pair being associated in pairs with a pair of said racks; two rotative shafts interconnecting the gear means in each pair of gear means; two guide bars each extending parallel to one of said shafts and mounted relative to said gear means whereby to simultaneously pass transversely across said table top; and working tool means slidably affixed to each of said guide bars, whereby to remain at the junction of said bars so as to be variously positioned upon said working surface and rotary indicator means connectable to said gear means for manifesting travel of said guide bars.

5. A graphic arts table comprising: a table top for providing a working surface; a plurality of gear racks mounted adjacent the working surface of said table in opposing parallel pairs; a plurality of pairs of gear means individually associated with said gear racks, one gear means in each pair including a plurality of meshed gear wheels; a plurality of rotative shafts each interconnecting each pair of said gear means associated with a pair of said racks; and plural guide means individually mounted parallel to said rotative shafts and extending transversely across said table top, said guide means being attached to said rotative shafts whereby said guide means are transversely mated for coincident positioning upon said table top; a structure for supporting said table top; and pivot means centrally connecting said structure to said table top whereby said table top may be variously positioned relative to the vertical.

6. A graphic arts table comprising: a table top to provide a working surface; at least two pairs of parallel gear racks, the racks in each pair being positioned at opposing sides of said table top; at least two pairs of gear means, the gear means in each pair being associated in pairs with a pair of said racks; at least two rotative shafts interconnecting the gear means in each pair of gear means; tool holder means mounted to be moved by said rotative shafts and rotary indicator means connectable to each of said pairs of gear means for manifesting travel of said rotative shafts relative to said working surface.

7. A graphic arts table comprising: a generally rectangular table top having a working surface; a plurality of four gear racks mounted at the edges of said table top to substantially frame said working surface; a first gear box; a first plurality of intermeshed gear wheels mounted in said first gear box, one of said first wheels being engaged with a first of said racks; a second gear box; at least one first gear wheel mounted in said second gear box and engaged with a second of said racks; first elongate shaft means rotatively connected to said first and said second gear boxes and fixed to the gear wheels engaging said first and second racks; a third gear box; a second plurality of intermeshed gear wheels mounted in said second gear box, one of said second wheels being engaged with a third of said racks; a fourth gear box; at least one second gear wheel mounted in said fourth gear box and engaged with a fourth of said racks; second elongate shaft means rotatively connected to said third and fourth gear boxes and fixed to the gear wheels engaging said third and fourth racks, said second shaft means being transverse to said first shaft means whereby said shaft means may pass one another; at least one indicating wheel affixed in each of said first and third gear boxes whereby to indicate movement of the associated shaft means; and clutch means for disengaging said indicating wheel from the shaft means.

8. Apparatus according to claim 7 further including a tool holder connected to be carried by both of said shaft means whereby to be variously positioned on said table top.

9. A graphic arts table for supporting a work piece for operations by a work tool, comprising: a generally rectangular table top having a working surface to receive said work piece; a plurality of four gear racks mounted at the edges of said table top to substantially frame said working surface; a first gear box; a first plurality of gear shafts mounted in said first gear box; a first plurality of intermeshed gear wheels mounted on said first plurality of gear shafts, one of said first wheels being engaged with a first of said racks; at least one indicator wheel mounted on one of said first gear shafts for manifesting revolution of said first plurailty of gear wheels; a second gear box; at least one first gear wheel mounted in said second gear box and engaged with a second of said racks; a first elongate shaft means rotatively connected to said first and second gear boxes and connectable to the gear wheels engaging said first and second racks; a third gear box; a second plurality of gear shafts mounted in said second gear box; a second plurality of intermeshed gear wheels mounted on said second plurality of gear shafts, one of said second wheels being engaged with a third of said racks; a fourth gear box; at least one second gear wheel mounted in said fourth gear box and engaged with a fourth of said racks;

a second elongate shaft means rotatively connected to said third and fourth gear boxes and connectable to the gear wheels engaging said third and fourth racks and means functioning in cooperative relationship with said first and second elongate shafts for guiding said work tool.

10. A graphic arts table comprising:
- a table top for providing a working surface;
- a plurality of gear racks mounted adjacent the working surface of said table in opposing parallel pairs;
- a plurality of gear means individually coupled to each of said gear racks;
- a first rotative shaft connected between one pair of opposed gear means to provide a first carriage;
- a first guide bar means affixed to said first carriage to provide a first guide edge contiguous said working surface;
- a second rotative shaft connected between another pair of opposed gear means to provide a second carriage mating with said first carriage so said carriages can both be selectively positioned concurrently on said table top; and
- a second guide bar means affixed to said second carriage to provide a second guide edge contiguous said working surface.

11. A graphic arts table comprising:
- a table top for providing a working surface;
- a plurality of gear racks mounted adjacent the working surface of said table in opposing parallel pairs;
- a plurality of gear means individually coupled to each of said gear racks and certain thereof including a first gear wheel to mesh with a gear rack, and indicator means coupled to said gear wheel for manifesting rotary displacement thereof relative a reference position;
- a first rotative shaft connected between one pair of opposed gear means to provide a first carriage;
- a first guide bar means affixed to said first carriage to provide a first guide edge contiguous said working surface;
- a second rotative shaft connected between another pair of opposed gear means to provide a second carriage mating with said first carriage so said carriages can both be selectively positioned concurrently on said table top; and
- a second guide bar means affixed to said second carriage to provide a second guide edge contiguous said working surface, and perpendicular said first guide edge.

References Cited by the Examiner

UNITED STATES PATENTS

| | | | |
|---|---|---|---|
| 594,808 | 11/97 | Owen | 33—26 |
| 1,511,626 | 10/24 | Marino. | |
| 2,252,535 | 8/41 | West et al. | 33—184.5 |
| 2,323,649 | 7/43 | Davis | 33—32 |
| 2,901,832 | 9/59 | Hulen | 33—184.5 |
| 3,026,623 | 3/62 | Charnock | 33—184.5 |

ISAAC LISANN, *Primary Examiner.*